(12) United States Patent
Wu et al.

(10) Patent No.: US 12,709,019 B2
(45) Date of Patent: Aug. 18, 2026

(54) END EFFECTOR OF WAFER TRANSFER ROBOT WITH EMBEDDED SENSORS

(71) Applicants: MICROPROGRAM INFORMATION CO., LTD., Taichung (TW); T-PARUS TRADING CO., LTD., Taichung (TW); SHENG CHYUAN TECHNOLOGY CO., LTD., Taoyuan (TW)

(72) Inventors: Teng Yen Wu, Taichung (TW); Chia Wei Liu, Taichung (TW)

(73) Assignee: MICROPRGRAM INFORMATION CO., LTD., Taichung (TW)

( * ) Notice: Subject to any disclaimer, the term of this patent is extended or adjusted under 35 U.S.C. 154(b) by 922 days.

(21) Appl. No.: 18/064,164

(22) Filed: Dec. 9, 2022

(65) Prior Publication Data

US 2023/0191624 A1 Jun. 22, 2023

(30) Foreign Application Priority Data

Dec. 22, 2021 (TW) ................................ 110148168

(51) Int. Cl.
*B25J 15/00* (2006.01)
*B65G 47/90* (2006.01)

(52) U.S. Cl.
CPC .............. *B25J 15/00* (2013.01); *B65G 47/90* (2013.01)

(58) Field of Classification Search
CPC ....... B25J 15/00; B25J 15/0019; B65G 47/90; F16F 7/10; H10P 72/3402; H02H 7/0844
See application file for complete search history.

(56) References Cited

U.S. PATENT DOCUMENTS

| | | | | |
|---|---|---|---|---|
| 10,777,439 | B1 * | 9/2020 | Takano | H10P 72/3402 |
| 2013/0213169 | A1 * | 8/2013 | Tan | F16F 7/10 294/213 |
| 2017/0348772 | A1 * | 12/2017 | Morimura | B25J 15/0019 |
| 2020/0412123 | A1 * | 12/2020 | Morris | H02H 7/0844 |

FOREIGN PATENT DOCUMENTS

| | | |
|---|---|---|
| TW | M571297 U | 12/2018 |
| TW | M613754 U | 6/2021 |
| TW | M618590 U | 10/2021 |

* cited by examiner

*Primary Examiner* — Gene O Crawford
*Assistant Examiner* — Sydney Jeanine Simmons
(74) *Attorney, Agent, or Firm* — Sinorica International Patent & Trademark

(57) ABSTRACT

An end effector, which is connected to a wafer transfer robot, includes a main member, a sensor and a lid. The main member has a first room on a side thereof, in which the sensor is received. The lid is fixed to the main member to cover the sensor. The sensor transmits a vibration signal to a central controller when the main member is vibrating. The end effect may work in a narrow space to transfer wafers and still keep high sensible and precise detection of vibration.

8 Claims, 6 Drawing Sheets

END EFFECTOR OF WAFER TRANSFER ROBOT WITH EMBEDDED SENSORS

BACKGROUND OF THE INVENTION

1. Technical Field

The present invention relates to a wafer transfer robot, and more particularly to an end effector of a wafer transfer robot having embedded sensors.

2. Description of Related Art

In the field of semiconductor manufacture, wafers have to be precisely transferred to predetermined positions for following processes. Therefore, robots, which are controlled by computers, are widely used in wafer manufacture. In real processes, the robot might function abnormally because of vibration or shift, and these abnormal functions hugely affect the precision of the robot in transfer of wafers. In order to prevent this problem, some robots are mounted with sensors to sense any vibration and/or shift of the robot to make sure that the robot functions normally. Once an abnormal signal is detected by the sensors, this signal is sent to a main controller to alarm the operators or stop the robot.

In prior arts, Taiwan utility model M618590 discloses a system to monitor vibration and a horizontal level of a robot to provide a warning signal when an abnormality is detected. Taiwan utility model M613754 discloses a sensing device mounted on a robot close to a base or a motor thereof to sense abnormal situations of the robot. Taiwan utility model M571297 discloses a device to detect an abnormality of a robot in advance. The device includes several sensors mounted on a transmission system of the robot to collect data when the robot is working. The device provides an alarm when the detected data is abnormal.

For example, there is a 10 mm working space for 12 inch wafers, and it narrows to a 4.6 mm working space for 6 inch wafers. Some traditional robots have the sensors mounted on the surfaces thereof. Such robots are not suitable to work in a narrow space because the sensors will increase a thickness of an end effector of the robot. To prevent this problem, some robots have the sensors mounted on a place other than the end effector. It allows the robot to work in a narrow space, however, it reduces sensitivity of the sensing results since the sensors are far away from the wafer. Besides, the sensors on the surface of the robot will be affected by environment pollutions, such as chemical substances, dust, or static electricity. As a result, error detections might occur. In conclusion, to provide an improved robot without the above drawbacks is the main target in the semiconductor manufacture field.

BRIEF SUMMARY OF THE INVENTION

In view of the above, the primary objective of the present invention is to provide an end effector of a wafer transfer robot, which may work in a narrow space and still has high sensitivity and precise detection.

In order to achieve the objectives of the present invention, an end effector, which is connected to a wafer transfer robot, comprises a main member having a first room on a side thereof; a sensor received in the first room to sense vibration of the main member; and a lid fixed to the side of the main member to cover the sensor. The sensor transmits a vibration signal to a central controller when the main member is vibrating.

With the design of the present invention, the end effect may work in a narrow space to transfer wafers and still keep high sensible and precise detection of vibration. Besides the end effector of the present invention may isolate the sensor from environment pollutions.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
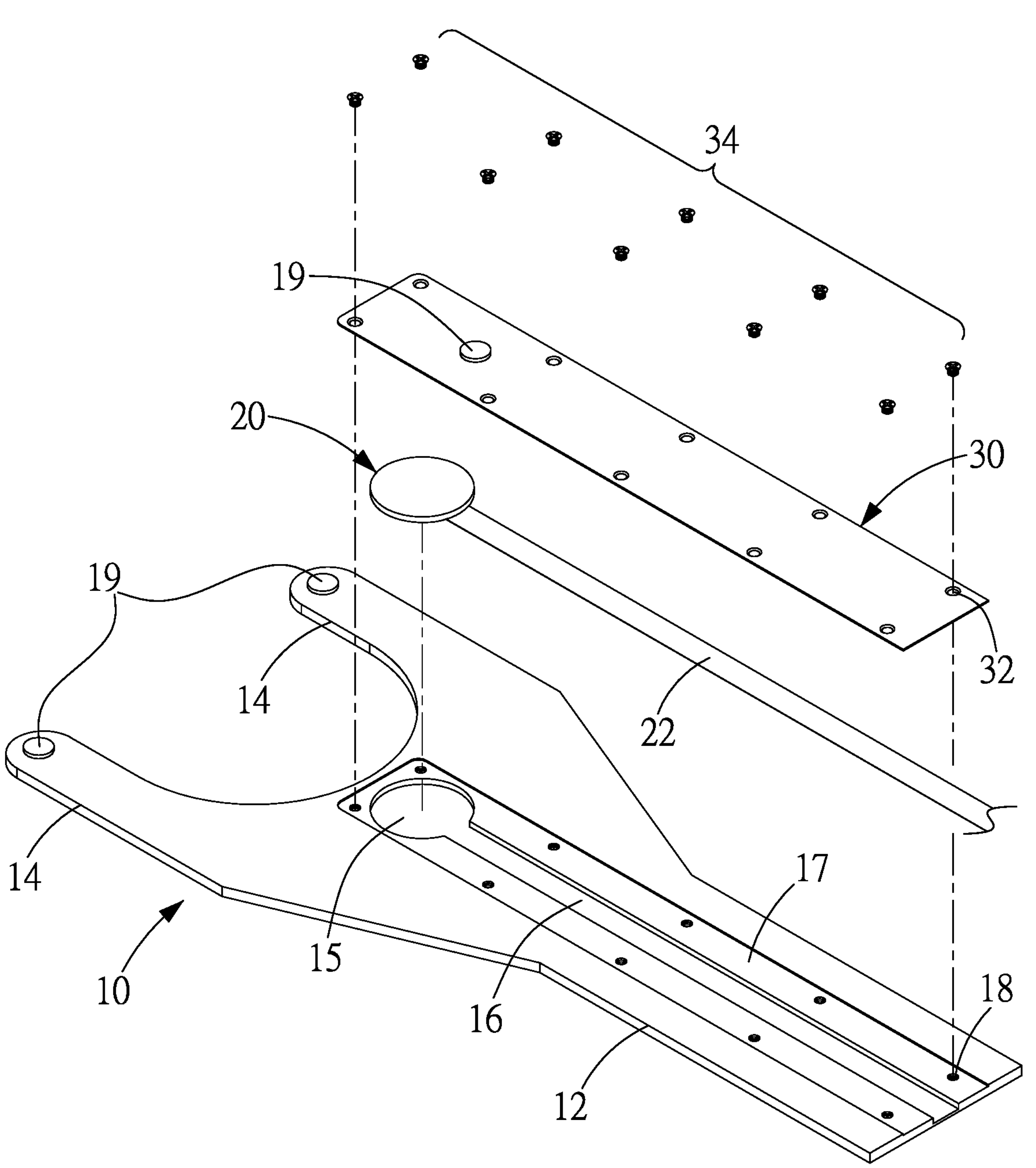
FIG. 1 is an exploded view of a first preferred embodiment of the present invention.
Figure 2:
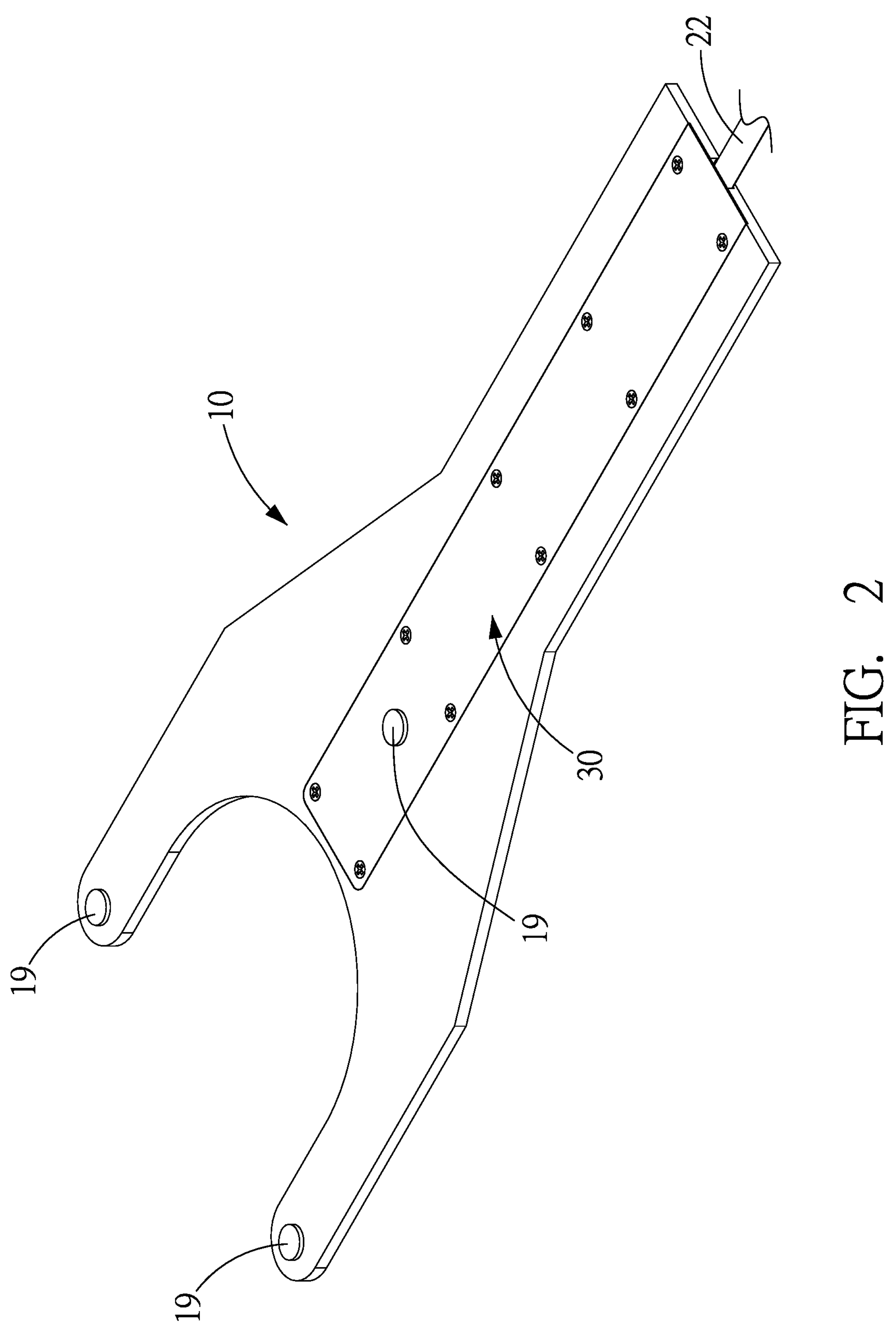
FIG. 2 is a perspective view of the first preferred embodiment of the present invention.

FIG. 1 and FIG. 2 show an end effector of a wafer transfer robot of the first preferred embodiment of the present invention, including a main member 10, a sensor 20, and a lid 30.

The main member 10 is a fork-like member for holding a wafer, including a handle 12 and two branches 14. The main member 10 has a thickness less than 3 mm. the handle 12 has a width of an end thereof greater than the other end thereof. The branches 14 are connected to the wide end of the handle 12 and kept a predetermined distance from each other. The main member 10 has a first room 15, a second room 16, and a third room 17 on a side of the handle 12. The third room 17 is a rectangular slot and is wider than the first and the second rooms 15 and 16. Both the first and the second rooms 15 and 16 are provided on a bottom of the third room 17. The first room 15 is round and adjacent to the branches 14, and the second room 16 has an end connected to the first room 15. Both the second and the third rooms 16 and 17 are open at the narrow end of the handle 12. The main member 10 further has a plurality of threaded holes 18 on the bottom of the third room 17. Three holding devices 19 are provided on the main member 10, two of which are provided on the branches 14 adjacent to distal ends thereof, and the third of which is adjacent to the wide end of the handle 12. Precisely, the third holding device 19 is provided on the lid 30. In the present embodiment, the holding devices 19 are frictional pads to hold the wafer on the end effector.

The sensor 20 is a thin electronic device received in the first room 15. In the present embodiment, a thickness of the sensor 20 is less than a depth of the first room 15. In other words, the sensor 20 is not higher than the surface of the main member 10 nor the bottom of the third room 17. The sensor 20 is a microelectromechanical system (MEMS) to sense vibration of the end effector. Once a vibration of the end effector is detected, the sensor 20 transmits a vibration signal to a central controller 3 (shown in FIG. 3). The transmission of the vibration may be wireless transmission or wire transmission. In the present embodiment, a wire 22 is received in the second room 16 and connected to the sensor 20 in the first room 15. A diameter of the wire 22 is no greater than a depth of the second room 16. The wire 22 has opposite ends connected to the sensor 20 and the central controller for transmission of the vibration signals. In another embodiment, the sensor 20 is connected with a Bluetooth device or an infrared device for wireless transmission of the vibration signals.

The lid 30 is a thin plate with a shape and size substantially the same as a cross section of the third room 17. In the present embodiment, the lid is made of aluminum, and a thickness thereof is not larger than a depth of the third room 17. The lid 30 is received in the third room 17 and attached to the bottom of the third room 17 with a top of the lid 30 no higher than the side of the main member 10. The lid 30 is fixed to the main member 10 to cover both the sensor 20 and the wire 22. In the present embodiment, the lid 30 is provided with bores 32. Screws 34 are inserted into the bores 32 and screwed into the threaded holes 18 to fix the lid 30 in the third room 17. In another embodiment, the lid 30 is fixed to the main member 10 by welding or other equivalent ways or devices.

Figure 3:
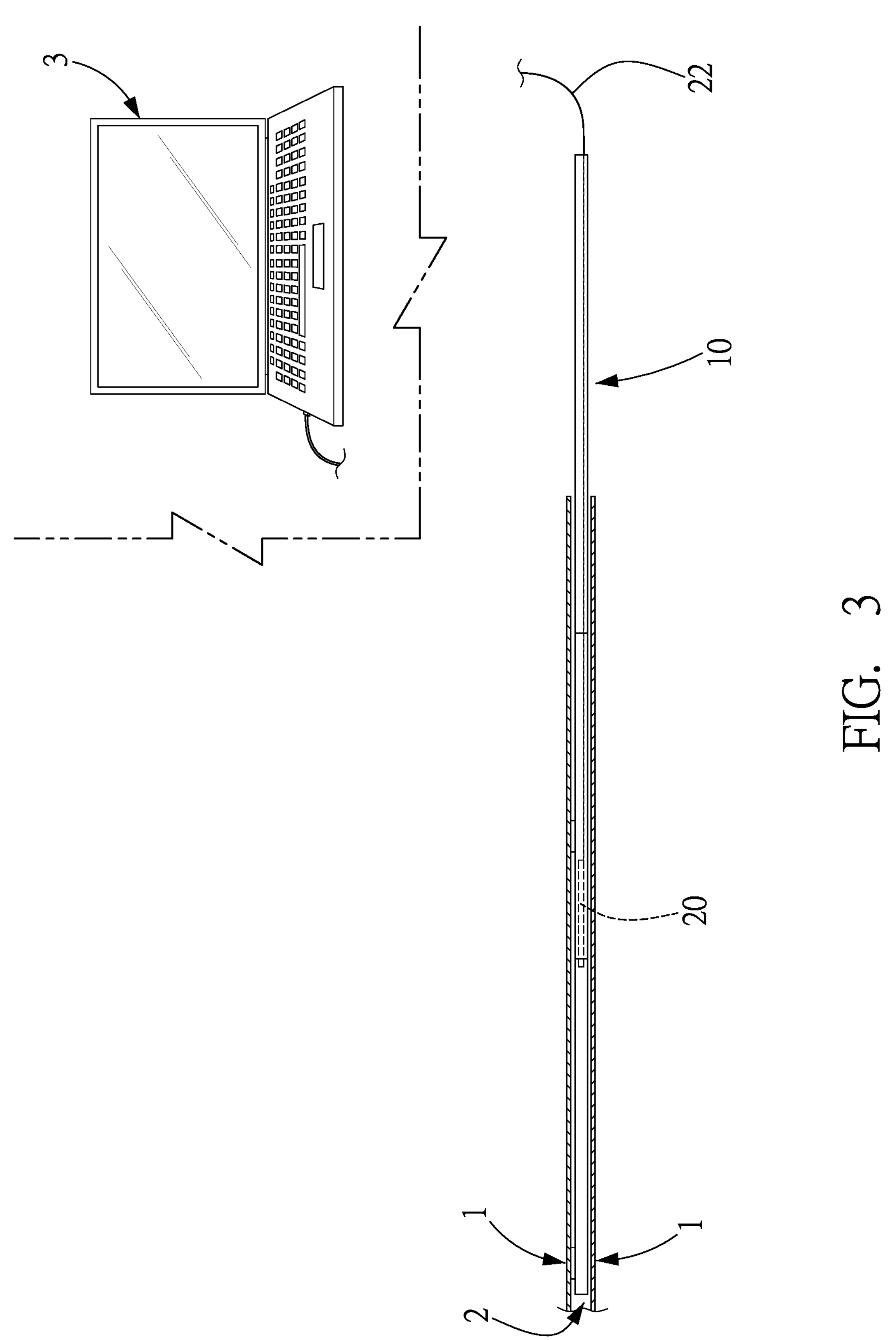
FIG. 3 is a sectional view of the first preferred embodiment of the present invention, showing the sensors connected to the main controller.
Figure 4:
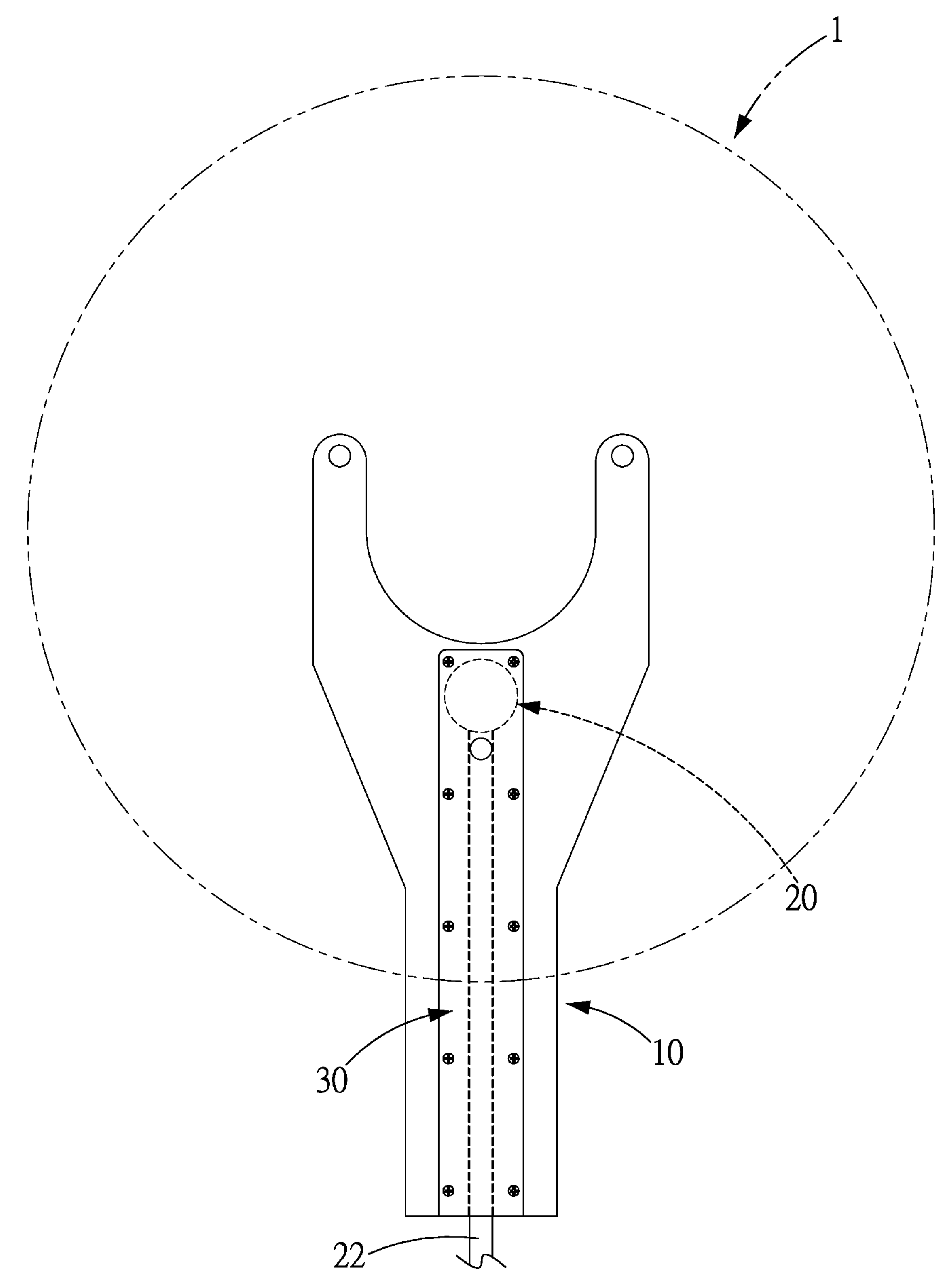
FIG. 4 is a top view of the first preferred embodiment of the present invention, showing a wafer being hold by the end effector.

As shown in FIG. 3 and FIG. 4, the sensor 20 is embedded in the main member 10 of the end effector without having to increase the thickness thereof. As a result, the end effector of the present invention may enter a narrow working space 2 between two wafers 1 to transfer the wafer 1. The sensor 20 generates a vibration signal accordingly when a vibration is detected in transfer of the wafer 1. The central controller 3 receives and examines the vibration signal from the sensor. The central controller 3 may stop the transfer robot or sound an alarm when the vibration signal is determined as an abnormal situation. With the design of the present invention, the end effector may have a small thickness to allow the end effector to work in a narrow space. For example, in the manufacture of 6 inch wafers, the working space is about 4.6 mm, and the present invention may reduce the thickness of the end effector to 3 mm. Besides, the sensor 20 is covered by the lid 30 to isolate the sensor 20 from chemical substances, dust, and static electricity to keep the sensor 20 in high sensibility and reliability.

Figure 5:
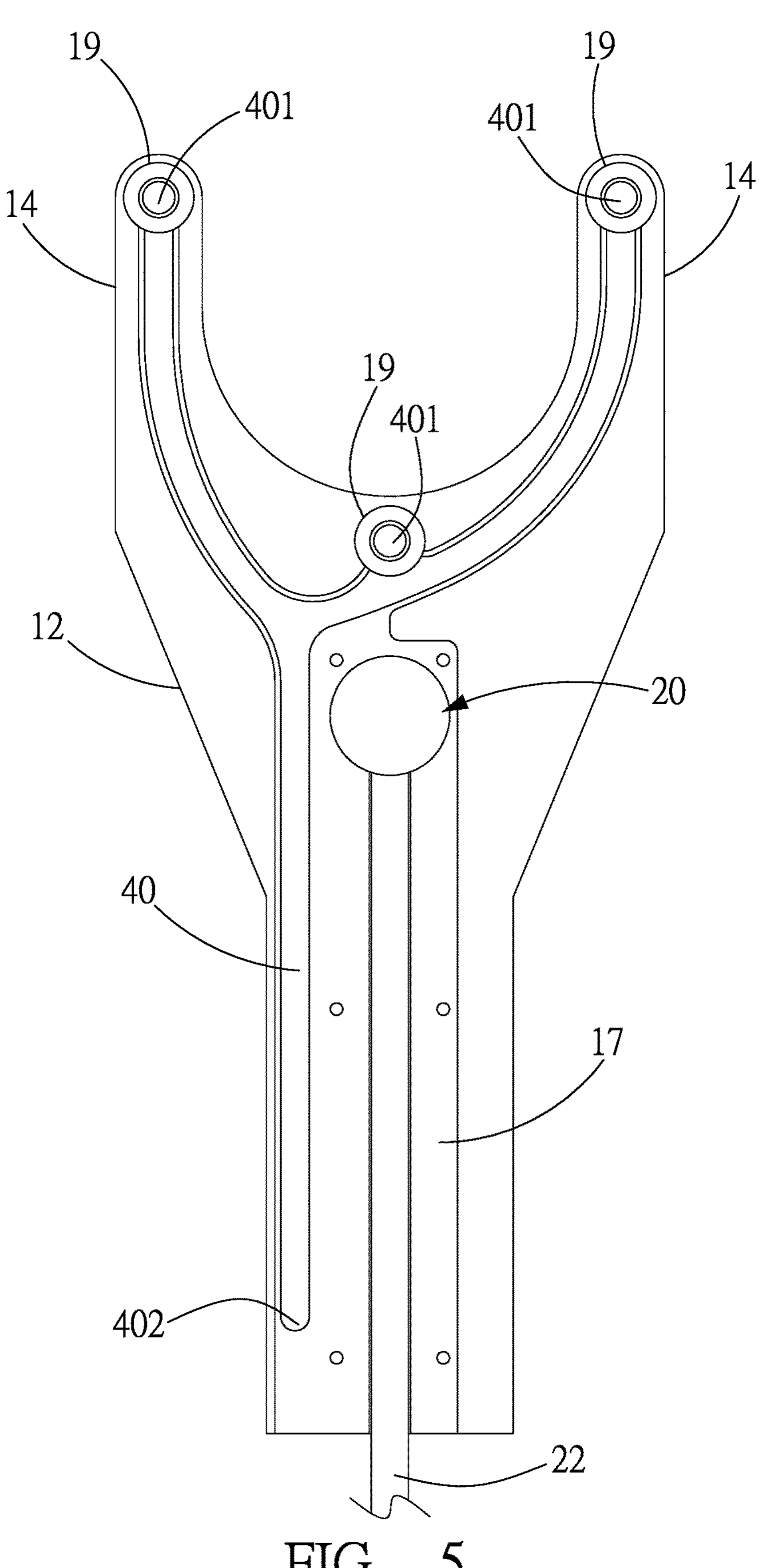
FIG. 5 is a top view of a second preferred embodiment of the present invention, in which the lid is removed.
Figure 6:
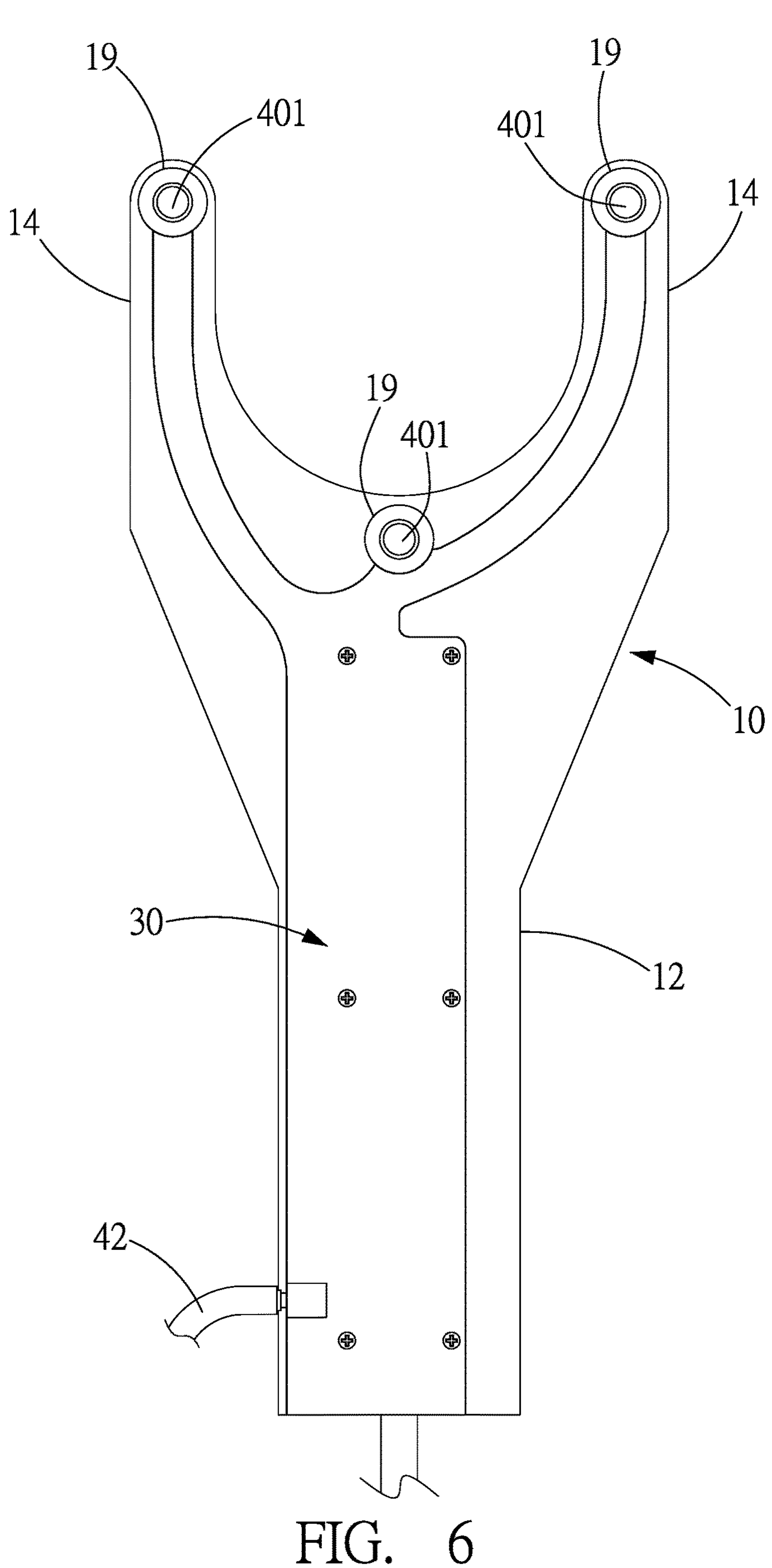
FIG. 6 is a top view of the second preferred embodiment of the present invention, in which the lid is mounted.

FIG. 5 and FIG. 6 show an end effector of a wafer transfer robot of the second preferred embodiment, which is similar to the first preferred embodiment, except that the holding devices 19 include a plurality of suckers. Each of the suckers 19 has a channel. The main member 10 is provided with an airway 40. The airway 40 has first ends 401 connected to the channels of the suckers 19 and a second end 402 connected to an air compressor 42. The air compressor 42 pumps air in the suckers 19 out through the airway 40. In the present embodiment, the airway 40 is a slot on the bottom of the third room 17 and sealed by the lid 30. In such condition, the third room 17 is a Y-shaped slot, and the lid 30 is Y-shaped accordingly to cover the sensor 20, the wire 22 and the airway 40.

The second preferred embodiment provides another way to hold the wafer through the air compressor 42 and the suckers 19. In another embodiment, the end effector is provided with the suckers and the frictional pads.

It is noted that the main member 10 may be any shape other than Y shape, such as square, ellipse, or other shapes.

In another embodiment, the sensor 20 is embedded in the main member 10 without the lid 30 by molding or other equivalent ways.

In conclusion, the present invention provides the end effector with embedded sensors as described above, in which the first room 15 is provided in the main member 10 to receive the sensor 20 therein. As a result, the end effector may sense vibrations without having to increase the thickness thereof. In my design, the sensor 20 is covered by the wafer when the end effector is holding the wafer, so that the sensor 20 may have high sensibility. Again the sensor 30 is totally embedded in the main member 10 (by the lid 30 in the preferred embodiments of the present invention), which may isolate the sensor 20 from environment pollutions to keep the sensor 20 functioning normally. My invention is the best solution for the wafer transfer robot to work in the narrow space with high sensibility, availability and usability.

It must be pointed out that the embodiments described above are only some preferred embodiments of the present invention. All equivalent structures which employ the concepts disclosed in this specification and the appended claims should fall within the scope of the present invention.

What is claimed is:

1. An end effector, which is connected to a wafer transfer robot, comprising:
- a main member having a first room on a side thereof;
- a sensor received in the first room to sense vibration of the main member; and
- a lid fixed to the main member to cover the sensor;
- whereby the sensor transmits a vibration signal to a central controller when the main member is vibrating;
- wherein the main member further has a second room, and the second room is communicated with the first room; a wire is received in the second room and connected to the sensor; the lid covers the wire as well;
- wherein the main member further has a third room, and the first and the second room are provided on a bottom of the third room; the lid is received in the third room.

2. The end effector of claim 1, wherein the main member is provided with threaded holes on the bottom of the third room while the lid is provided with bores accordingly; a plurality of screws are inserted into the bores and screwed into the threaded holes respectively.

3. The end effector of claim 1, wherein a thickness of the sensor is no greater than a thickness of the main member.

4. The end effector of claim 1, wherein a top of the lid is no higher than the side of the main member.

5. The end effector of claim 1, wherein the main member is provided with a holding device for holding a wafer carried by the end effector.

6. The end effector of claim 5, wherein the holding device has a frictional pad to provide the wafer with friction.

7. The end effector of claim 5, wherein the holding device has a sucker, and the sucker has a channel; the main member is provided with an airway, and the airway is covered by the lid as well; the airway is connected to the channel of the sucker, whereby air in the sucker is pumped out through the channel and the airway.

8. The end effector of claim 1, wherein an airway is provided on the bottom of the third room, and the airway is covered by the lid as well; a sucker is provided on the main member and connected to the air way, whereby air in the sucker is pumped out through the airway.

* * * * *